United States Patent [19]

Beal

[11] 4,418,531
[45] Dec. 6, 1983

[54] FLAMEHOLDER STABILIZATION PLATE FOR AN AIRCRAFT ENGINE AFTERBURNER SYSTEM

[75] Inventor: George W. Beal, Palm Beach Gardens, Fla.

[73] Assignee: The United States of America as represented by the Secretary of the Air Force, Washington, D.C.

[21] Appl. No.: 318,652

[22] Filed: Nov. 5, 1981

[51] Int. Cl.³ .............................................. F02K 3/10
[52] U.S. Cl. ........................................ 60/261; 60/749
[58] Field of Search ................ 60/261, 39.11, 749, 60/734; 431/350, 351, 354

[56] References Cited

U.S. PATENT DOCUMENTS

| | | | |
|---|---|---|---|
| 2,978,865 | 4/1961 | Pierce | 60/261 |
| 3,618,318 | 11/1971 | Bryce | 60/39.72 |
| 3,653,207 | 4/1972 | Stenger et al. | 60/39.65 |
| 3,800,527 | 4/1974 | Marshall et al. | 60/749 X |

OTHER PUBLICATIONS

*IHI Engineering Review,* "Basic Study of the Afterburner", Yoshiyuki Ohra, Sep. 1970.

*Primary Examiner*—Louis J. Casaregola
*Assistant Examiner*—Donald E. Stout
*Attorney, Agent, or Firm*—Donald J. Singer; John R. Flanagan

[57] ABSTRACT

A flameholder stabilization plate attaches to the lower part of a flameholding baffle disposed in an afterburner system of a turbofan engine. The plate includes extension tabs which extend laterally from a main body of the plate and block contact by cool fuel droplets entrained in a cold fan air stream flow with the baffle. The tabs disperse some large droplets into smaller ones which flow to a recirculation flame zone behind the baffle where a leaner fuel-air mixture is formed. Other large droplets of fuel are directed by the tabs to combustion zones at lateral sides of the baffle where a richer fuel-air mixture is formed. The leaner mixture in the recirculation zone will result in a more stable flame which, in turn, will more efficiently burn the richer mixture of fuel in the lateral combustion zones.

3 Claims, 3 Drawing Figures

FLAMEHOLDER STABILIZATION PLATE FOR AN AIRCRAFT ENGINE AFTERBURNER SYSTEM

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to combustion stability in the afterburner system of a jet aircraft engine and, more particularly, is concerned with a device for providing a more stable flame in the fan stream region of the afterburner during augmentor operation in a turbofan jet engine.

2. Description of the Prior Art

In order to increase the effective thrust of the common turbojet engine, bladed fans have been added to a turbine-driven shaft thereof to effect the flow of a quantity of atmospheric air through an annular passage defined between the turbine and a radially spaced casing added thereto. The turbofan engine, as this combination has come to be known, has been found to be more efficient if the hot gas stream flow from the core engine (the basic turbojet portion of the turbofan) and the fan stream (the air stream forced through the annular passage by the fan) are mixed together before expulsion through a single discharge nozzle.

To develop still more thrust for takeoff and climb and for periods of dash of the aircraft, it is also advantageous to augment the engine thrust by burning additional fuel in an afterburner system. The afterburner system would be located in the turbofan engine between the turbine and the discharge nozzle at a desired location for both mixing and combustion of the hot gas stream flow from the core engine and the fan stream flow from the annular passage leading from the bladed fan.

It has been the practice in afterburner systems to use fixed baffles as flameholders at such mixing and combustion location. Baffles produce stable turbulent (or recirculation) zones wherein flames will maintain themselves. However, such baffles offer undesirable resistance to flow during periods when afterburning is not in operation. Thus, there is a tradeoff involved in using an afterburning system to augment thrust.

One of the more common forms of the fixed baffle is a V-shaped gutter having its apex pointing upstream of the flow. By setting the legs of the gutter to an included angle on the order of 45 to 60 degrees to flow velocity, a reasonably optimum tradeoff between resistance and the provision of an adequate recirculation zone can be obtained. However, when cold augmentor fuel droplets fed into the fan stream flow contact the baffle, the latter is cooled to the extent that smooth combustion of the augmentor fuel in the afterburner is impeded. Instead, an unevenly burning flame results which causes a low frequency rumble in the afterburner system as well as low efficiency combustion of the augmentor fuel. Therefore, a need exists for a technique to shield the flameholder baffle from contact by cold fuel while improving the delivery of the fuel to the recirculation zone wherein the flame is maintained.

SUMMARY OF THE INVENTION

The present invention obviates the above-described problems of prior art afterburner baffles by providing a flameholder stabilization plate connected to the baffle within the cold air stream flow which directs a leaner fuel-air mixture to a flame recirculation zone behind the baffle and a more efficiently burning, richer fuel-air mixture to combustion zones at lateral sides of the baffle. The plate promotes these respective variations in fuel-air mixtures relative to the baffle by dispersing some large droplets of fuel into small droplets thereof which flow to the recirculation flame zone behind the baffle and by directing the flow of other large droplets of fuel to the lateral combustion zones. In such manner, the flame in the recirculation zone burns with more stability during augmentor operation which substantially reduces, if not eliminates, low frequency rumble in the afterburner system.

More particularly, the flameholder stabilization plate includes a main body attached to the baffle and a plurality of extension tabs extending laterally from opposite sides of the body for substantially blocking contact of cool fuel droplets with the baffle. This shielding allows the baffle to remain at a high temperature and thus the flame held thereby more stable. The baffle is comprised by a pair of legs connected together in a V-shaped configuration with an apex formed by the connection of the legs facing upstream relative the hot gas stream flow and cold air stream flow and the legs extending downstream relative the flows. The main body of the plate extends transversely to the baffle through a pair of slots formed in the legs thereof rearwardly of, but adjacent to, the portion of the apex of the baffle disposed within the cold air stream flow.

DETAILED DESCRIPTION OF THE INVENTION

Figure 1:
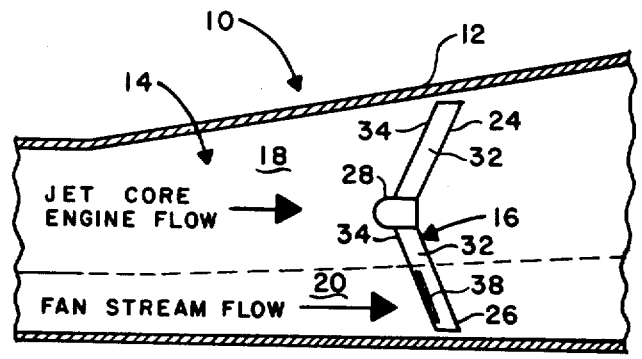
FIG. 1 is a fragmentary axial cross-sectional view of an exemplary turbofan engine afterburner combustion system showing in schematical form the flameholder stabilization plate of the present invention attached on a flameholder baffle positioned within the afterburner system.

Referring now to the drawings, and more particularly to FIG. 1, there is shown an afterburner system 10 of a conventional turbofan engine having a hollow casing 12 defining a fluid flow duct 14 and an elongated flameholding baffle 16 disposed in the casing across the duct. The baffle 16 at separate portions of its front side receives a hot gas stream flow 18 from a core engine (not shown) and a cold air stream flow 20 from a fan (not shown). The cold air stream has droplets 22 (FIG. 3) of cool augmentor fuel entrained therein.

The baffle 16 has upper and lower parts 24, 26 which extend in opposite directions from a central pilot 28 through which it is connected to the casing by a suitable means not shown in the drawing. As more clearly seen in FIGS. 2 and 3, each of the parts 24, 26 is comprised by a pair of legs 30, 32 connected together in a V- shaped configuration at an included angle of, for example, approximately 60 degrees. The point of connection of the legs together forms an apex 34 which faces upstream relative to the hot gas stream flow 18 and cold air stream flow 20. The legs 30, 32 extend downstream relative to these flows and define a flame recirculation zone 36 at the rear side of the baffle.

Figure 2:
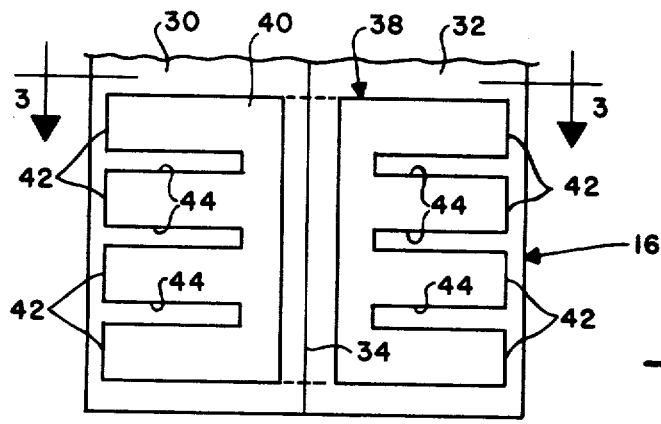
FIG. 2 is a fragmentary front elevational view of the stabilization plate attached to the lower portion of the baffle.

A flameholder stabilization plate 38 comprising the improvement provided by the present invention is shown in detail in FIG. 2. The plate 38 is attached to the baffle 16 substantially outside of the hot gas stream flow 18 so as to not impede it, but across the cold air stream flow 20 which entrains the droplets of fuel. The plate 38 substantially shields the baffle from contact by the droplets of cool augmentor fuel so as to provide a more stable flame in the recirculation zone 36.

More particularly, the stabilization plate 38 is of planar, one-piece construction and formed from the same metal as the baffle. The plate includes a main body 40 and a plurality of extension tabs 42 extending laterally from opposite sides of the main body. The tabs 42 are separated by slots 44. The plate 38 is suitably attached to the baffle 16 by first being inserted through a pair of aligned slots 46 formed in the legs 30, 32 of the baffle and then welded at its main body 40 to the legs. The slots 46 are located rearwardly of, but adjacent to, the portion of the apex 34 of the baffle within the cold air stream flow 20. By such arrangement, the plate 38 extends generally transversely to the baffle and across the cold air stream flow.

Figure 3:
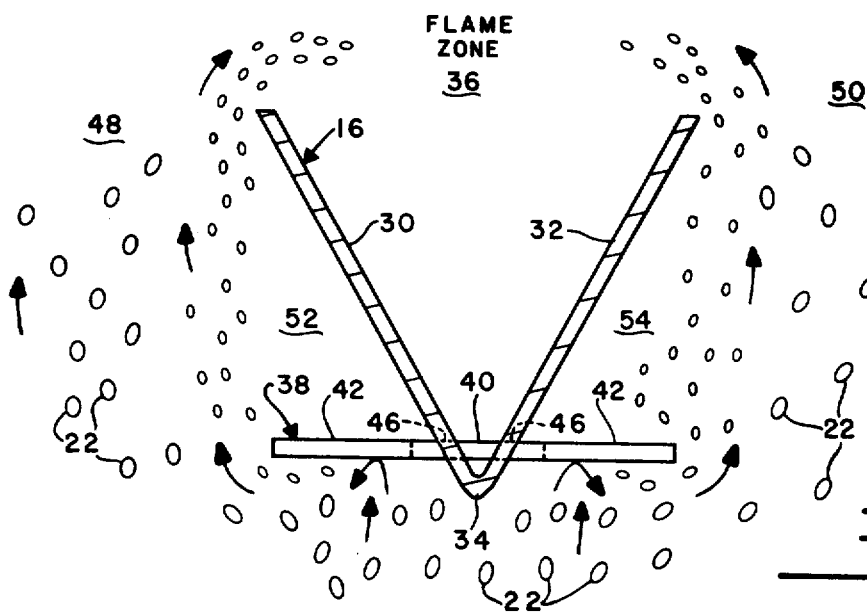
FIG. 3 is a cross-sectional view taken along line 3—3 of FIG. 2 showing the dispersion of fuel droplets by the plate.

The extension tabs 42 which extend laterally from opposite sides of the main body 40 substantially block contact of the cool fuel droplets with the baffle to allow the baffle to remain at a high temperature and thus the flame held thereby to be maintained with more stability. More specifically as seen in FIG. 3, various sizes of fuel droplets will impinge on the tabs 42. On the one hand, the extension tabs disperse some large droplets of fuel into small droplets thereof which flow to the recirculation flame zone 36, thereby forming a leaner fuel-air mixture therein. On the other hand, the tabs direct the flow of other large droplets of fuel to combustion zones 48, 50 at lateral sides of the baffle 16, thereby forming a richer fuel-air mixture therein. The leaner mixture in the recirculation zone 36 will result in a more stable flame which, in turn, will more efficiently burn the richer mixture of fuel in the lateral combustion zones 48, 50.

The slots 44 which separate the extension tabs 42 allow some cold fan stream air flow through the plate 38 and into the areas 52, 54 between the extension tabs and the baffle for inhibiting combustion of droplets of fuel in such areas. Some of the fuel droplets will accompany the small portion of cold fan stream air flow through slots 44. However, due to the much greater amount of plate surface area in comparison to the amount of space defined by lots 44, a much greater proportion of the air flow and fuel droplets therewith diverts around the lateral sides of the plate 38 to zones 48, 50, rather than through the slot 44 in the plate.

As is the case with the use of an afterburner system, there may be a tradeoff involved in utilizing the flameholder stabilization plate of the present invention. While the plate should improve combustion stability in the recirculation zone behind the baffle, it may also increase pressure drop within the engine and thereby somewhat adversely affect engine performance or thrust under some conditions. However, it is felt that its benefits would outweigh the costs.

It is thought that the flameholder stabilization plate of the present invention and many of its attendant advantages will be understood from the foregoing description and it will be apparent that various changes may be made in the form, construction and arrangement of the parts thereof without departing from the spirit and scope of the invention or sacrificing all of its material advantages the form hereinbefore described being merely a preferred or exemplary embodiment thereof.

Having thus described the invention, what is claimed is:

1. In an afterburner system of a turbofan engine having a hollow casing defining a fluid flow duct and an elongated flameholding baffle disposed in said casing across said duct for receiving at separate portions of its front side a hot gas stream flow from a core engine and a cold air stream flow from a fan with droplets of cool augmentor fuel entrained therein, said baffle defining a flame recirculation zone at its rear side, the improvement which comprises:

a generally planar flameholder stabilization plate attached to the portion of said baffle located substantially outside of said hot gas stream flow so as to not impede said flow but instead extend generally transversely to said baffle and across said cold air stream flow, said plate including a main body attached to said baffle and a plurality of extension tabs extending laterally from opposite sides of said body for substantially shielding said baffle from contact by said cold air stream flow and said droplets of cool fuel entrained therein so as to allow said baffle to remain at a high temperature and thus the flame held thereby in said recirculation zone to be more stable.

2. The afterburner system as recited in claim 1, wherein said extension tabs of said stabilization plate are separated by slots which allow cold fan stream air flow through said plate for inhibiting combustion of droplets of augmentor fuel in the area between said extension tabs and said baffle.

3. The afterburner system as recited in claim 1, wherein said baffle is comprised by a pair of legs connected together in a V-shaped configuration with an apex formed by the connection of said legs facing upstream relative said hot gas stream flow and said cold air stream flow and said legs extending downstream relative said flows, and wherein said main body of said plate extends transversely to said baffle through a pair of slots formed in said legs thereof rearwardly of, but adjacent to, the portion of said apex of said baffle within said cold air stream flow.

* * * * *